Aug. 11, 1936. A. H. CONNELL 2,050,690
VEHICLE FLUID ACTUATED JACK
Filed Dec. 11, 1935 2 Sheets-Sheet 1
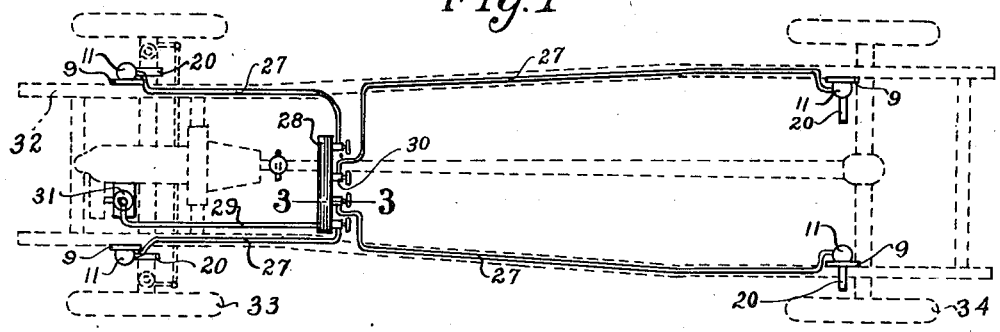
Fig. 1
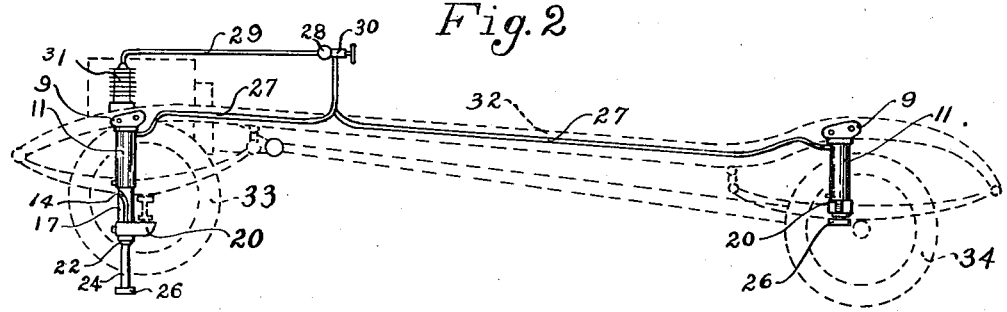
Fig. 2
Fig. 3
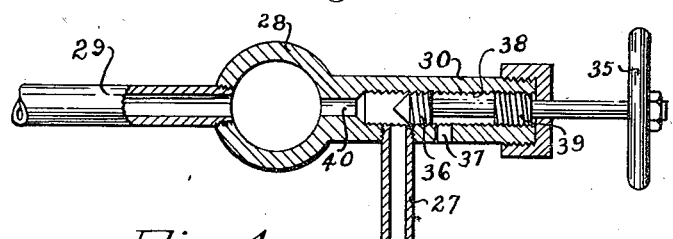
Fig. 4
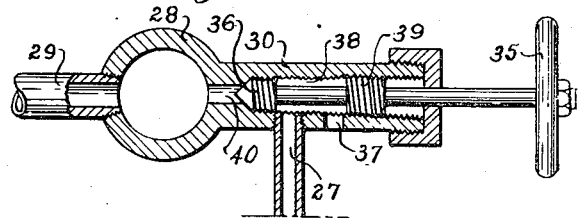
Alvin H. Connell
INVENTOR
BY Van Buren Hillyard
ATTORNEY Aug. 11, 1936.  A. H. CONNELL  2,050,690
VEHICLE FLUID ACTUATED JACK
Filed Dec. 11, 1935  2 Sheets-Sheet 2
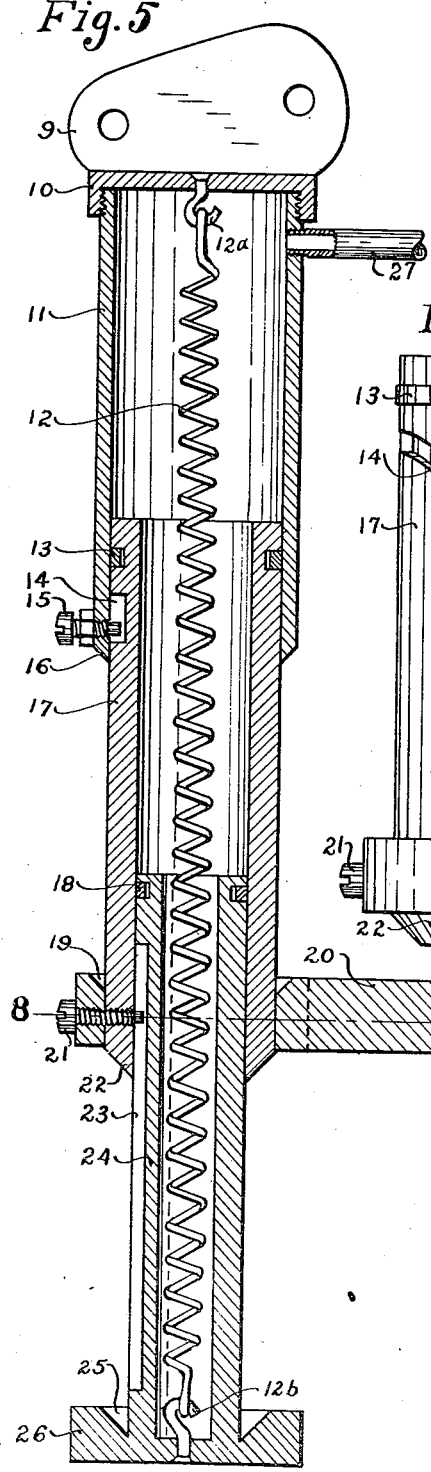
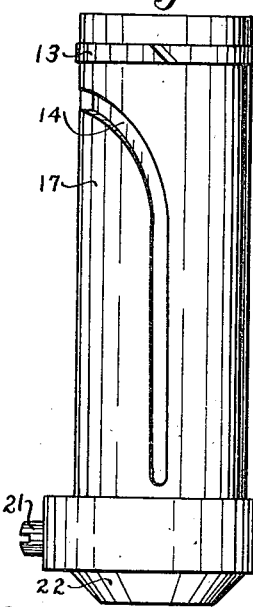
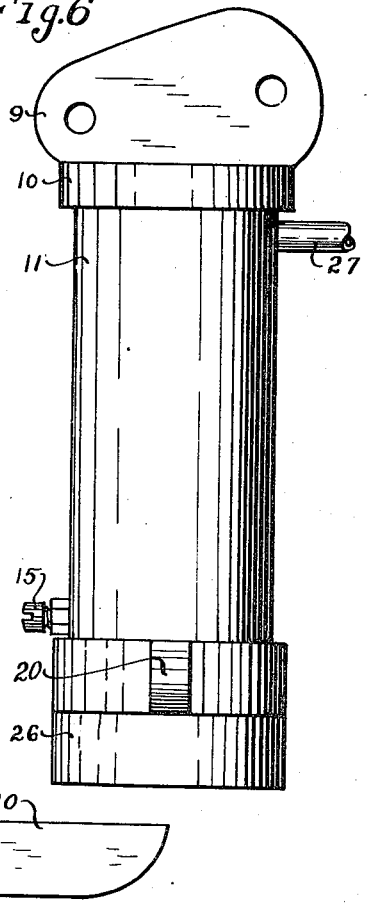
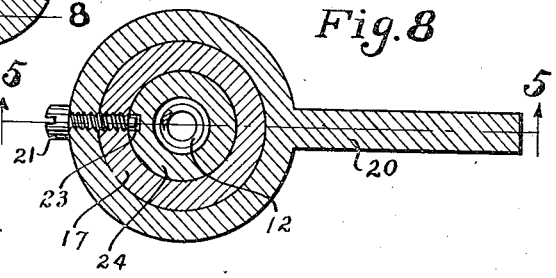
Alvin H. Connell
INVENTOR
BY Van Buren Hillyard.
ATTORNEY Patented Aug. 11, 1936

2,050,690

UNITED STATES PATENT OFFICE 2,050,690

VEHICLE FLUID ACTUATED JACK

Alvin H. Connell, Wichita Falls, Tex., assignor of forty per cent to William Fort Alford, Burkburnett, Tex.

Application December 11, 1935, Serial No. 53,974

5 Claims. (Cl. 254—86)

The invention relates to elevating means for vehicles of the type usually equipped with pneumatic tires and contemplates a system including a lifting unit for each wheel of the vehicle, and a control conveniently positioned to admit of the driver energizing any one of the lifting units to elevate a wheel, as occasion may require.

The invention provides a unique fluid actuated lifting unit embodying a plurality of telescoping members, one of such members carrying a load sustaining arm, and guide means for turning the member bearing said arm, as the members are extended or contracted, to bring the arm in position either to engage or clear the load.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a plan view illustrative of an applied embodiment of the invention.

Figure 2 is a side view thereof.

Figure 3 is an enlarged sectional view of the fluid pressure control on the line 3—3 of Figure 1, showing the valve open.

Figure 4 is a view similar to Figure 3 showing the valve closed.

Figure 5 is an enlarged sectional view of a lifting unit on the line 5—5 of Figure 8, showing the telescoping members extended.

Figure 6 is a view of the lifting unit with the members telescoped or contracted.

Figure 7 is a side view of the lifting unit member provided with the load sustaining arm and guide groove.

Figure 8 is a horizontal section on the line 8—8 of Figure 5.

Corresponding and like parts are referred to in the following description and designated in the several views of the drawings by like reference characters.

The dotted lines 32 designate the chassis of a motor vehicle of conventional form provided with front wheels 33 and rear wheels 34. A lifting unit is associated with each of the wheels and comprises a plurality of telescoping members 11, 17 and 24. These members are of cylindrical formation and have a piston fit one over the other to prevent escape of pressure. The lower ends of the members 11 and 17 are beveled, as shown at 16 and 22, respectively, to provide scraping edges to remove foreign matter as the members telescope when the unit is contracted. A contractile spring 12 within the unit and attached to the ends of the extreme members 11 and 24, normally tends to hold the members telescoped when the unit is in contracted position. The bottom member 24 is provided with an extended foot 26 to prevent sinking in soft ground. The top member is closed by a cap 10 having a lug 9 which is bolted or otherwise secured to the vehicle. The intermediate member 17 carries an arm 20 which receives and sustains the load. Stop means limit the downward movement of the member 24 and consist of a groove 23 in a side thereof and a screw 21 threaded into the member 17 and engaging the groove 23. The top member 11 is fixed and the member 17 receives a sliding and a turning movement, the latter bringing the arm 20 in position either to engage or clear the load, as will appear more fully hereinafter.

The fluid pressure control consists of a header 28, or like part, connected by pipe 29 with a source of pressure supply, as pump 31. A pipe 27 connects each of the lifting units with the header and includes a valve. This valve comprises a casing 30, preferably forming a part of the header 28 and projecting laterally therefrom. A valve seat 40 is provided at the inner end of the casing 30 and a valve plug or body closes thereon. The valve plug comprises spaced threaded portions 36 and 39, the space 38 therebetween providing an escape for the spent fluid pressure through outlet 37 formed in a side of the casing 30. A hand wheel 35 is secured to the stem or projecting end of the valve plug for convenience of operating the valve.

Guide means between the members 11 and 17 consist of a groove in the side of the member 17 and a screw 15 threaded into the member 11 and engaging said groove. The guide groove consists of a straight portion 14a and a curved portion 14 of a length and arrangement to cause a one quarter turn of the member 17 to position the arm 20 either to engage or clear the load in the operation of the jack. The curved portion is at the upper end of the straight part of the groove to cause the member 17 to turn when approaching the limit of its downward travel, or beginning its upward movement.

The pressure control is conveniently located to be readily accessible from the driver's seat. By manipulating any one of the valves the pressure may be admitted from the header 28 to the pipe line 27 leading to the lifting unit to be actuated to elevate the wheel desired to be jacked up. As the pressure enters the member 11 the members 17 and 24 are forced downward and, as the member 17 reaches the limit of its downward stroke it is turned by the elements 14 and 15, in the manner set forth, to bring the arm 20 beneath the axle or other part of the motor vehicle. The member 24 continues its downward movement until arrested by the foot 26 engaging the ground or other surface, when the pressure reacts to lift the unit and bring the arm 20 in contact with the axle to elevate it and the wheel thereon. To release the pressure, the valve is closed, as shown in Figure 4, thereby providing an escape from the unit through pipe 27, space 38 and outlet 37. The spring 12, extended when the members 11—17 and 24 are extended, contracts and returns the members to normal or contracted position. In the initial upward movement of the member 17, it is turned by the elements 14 and 15, in the manner herein set forth, to position the arm 20 to clear the axle to permit the return of the members 11, 17 and 24 to prearranged position. By opening all valves, the vehicle may be elevated to lift its wheels clear of the ground, as will be readily appreciated.

Having thus described the invention, what I claim is:

1. In a vehicle jack, a lifting unit comprising telescoping members, guide means between adjacent members for partly rotating one of them, and an arm on the rotating member positioned thereby to either engage or clear the load, substantially in the manner specified.

2. In a vehicle jack, a lifting unit comprising telescoping members, guide means between adjacent members for partly rotating one of them, said guide means embodying an element having straight and curved portions, and a coacting element, and an arm on the rotating member positioned thereby to either engage or clear the load, substantially in the manner specified.

3. In a vehicle jack, a lifting unit comprising telescoping members, guide means between adjacent members for partly rotating one of them, an arm on the rotating member positioned thereby to either engage or clear the load, and a contractile spring within the members and attached at its ends to the extreme members.

4. In a vehicle jack comprising telescoping members, the bottom member having a straight groove in its side, the next member having a stop engaging the said groove and provided with a groove having straight and curved portions, a projection coacting with the curved groove to effect a turning of the member in which the curved groove is formed, said projection being carried by the member next above the member in which the curved groove is formed, and an arm on the rotating member positioned thereby to either engage or clear the load, substantially in the manner specified.

5. A vehicle jack comprising top, bottom and intermediate members having a telescoping arrangement, the bottom member having a sustaining foot and the top member a cap provided with attaching means, a contractile spring within the members and attached to the ends of the top and bottom members, stop means between the intermediate and bottom members consisting of a groove and coacting element, a load engaging member on the intermediate member, and guide means between the top and intermediate members to effect a turning of the latter to position the load engaging member to sustain or clear the load.

ALVIN H. CONNELL.